(No Model.) 2 Sheets—Sheet 1.
D. HAZARD.
SAW.

No. 486,226. Patented Nov. 15, 1892.

WITNESSES
F. Clough.
M. A. Reeve.

INVENTOR
Dexter Hazard
By W. W. Leggett
Attorneys.

(No Model.) 2 Sheets—Sheet 2.

D. HAZARD.
SAW.

No. 486,226. Patented Nov. 15, 1892.

WITNESSES
F. Clough.
M. A. Reeve.

INVENTOR
Dexter Hazard
By W. W. Leggett
Attorneys.

UNITED STATES PATENT OFFICE.

DEXTER HAZARD, OF MARQUETTE, MICHIGAN, ASSIGNOR OF ONE-HALF TO FREDERICK O. CLARK, OF SAME PLACE.

SAW.

SPECIFICATION forming part of Letters Patent No. 486,226, dated November 15, 1892.

Application filed January 12, 1891. Serial No. 377,419. (No model.)

*To all whom it may concern:*

Be it known that I, DEXTER HAZARD, a subject of the Queen of Great Britain, residing at Marquette, county of Marquette, State of Michigan, have invented a certain new and useful Improvement in Saws; and I declare the following to be a full, clear, and exact description of the invention, such as will enable others skilled in the art to which it pertains to make and use the same, reference being had to the accompanying drawings, which form a part of this specification.

Figure 1:
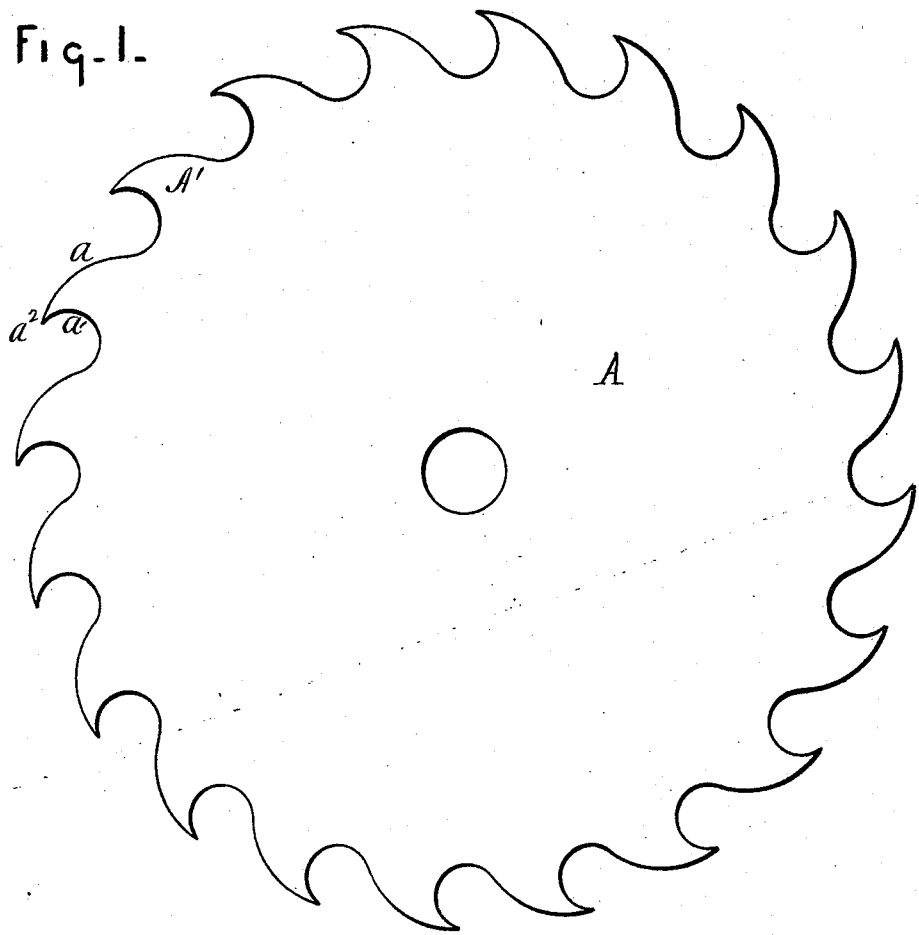
Figure 2:
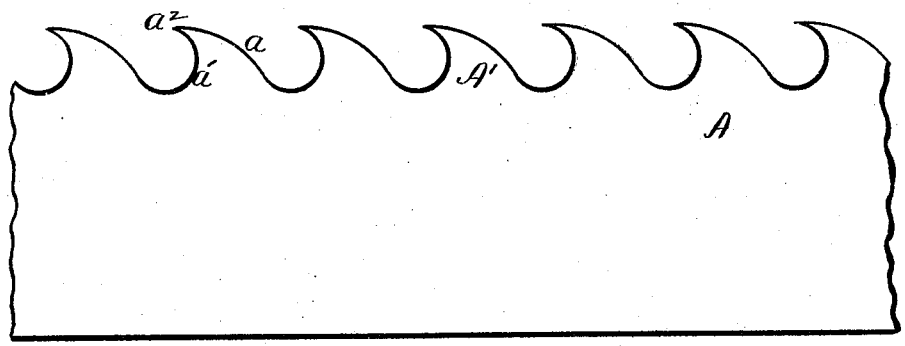
Figure 3:
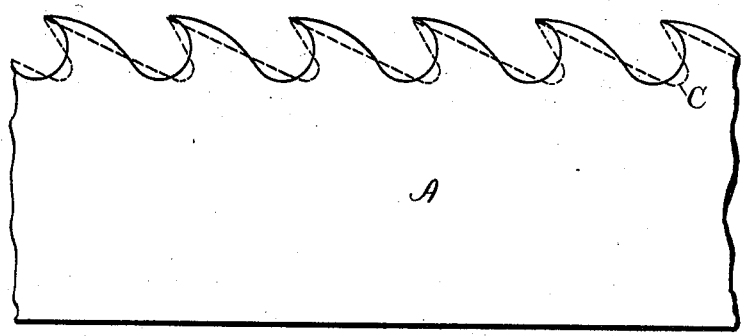
Figure 4:
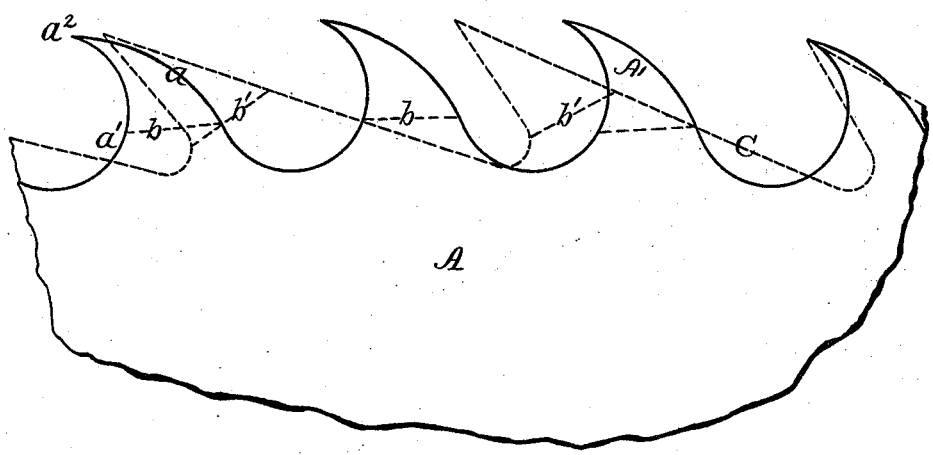

In the drawings, Figure 1 is a view in elevation of a circular saw embodying my invention. Fig. 2 is a similar view of a band-saw embodying my invention. Fig. 3 is a view of a band-saw embodying my invention and showing in dotted lines the ordinary construction heretofore in use where the same number of teeth are arranged in the same space and illustrating the greatly-reduced clearing-throat and reduced strength of the teeth of the old form. Fig. 4 is a similar view of a circular saw embodying my invention and showing by dotted lines the relative construction of saws, as heretofore in use, where like strength of tooth and like clearing-space are maintained.

Heretofore circular saws, as they have ordinarily been made, have been provided with teeth having a straight face, the same extending in a direction approximating a radial line and in severing the wood have acted upon the principle of scraping the same away rather than cutting or shaving it away. So, also, in order to provide them with a sufficient clearing-throat to accommodate the sawdust it has been necessary to gum away beneath the straight face. This has reduced the thickness between the gummed surface and the back of the same tooth to such an extent that, in order to have sufficient material to give to the tooth adequate strength, the point of the next tooth has necessarily been separated from the point of the adjacent teeth to a correspondingly-greater distance.

It is the purpose of my invention, first, to so shape the tooth that its point shall when in operation act to sever the wood by a cutting or shaving process in contradistinction to the ordinary scraping process; second, to simultaneously shape the throat so as to have the usual clearing-space to accommodate the sawdust and adequate strength in the body of the tooth without separating the working points so widely as heretofore.

To this end A may represent the body of a saw, and A' one of its teeth. The back of the tooth is shaped upon the arc of a circle, which is joined tangentially with a circular or gummed throat. The opposite side of this circular throat terminates at the point of the next adjacent tooth, so that each tooth is formed with its back and with its face upon the arcs of circles which join at the point of the tooth, constituting a sharp shaving-edge. The back of the tooth is represented by $a$, the circular throat and face by $a'$, and the point of the tooth by $a^2$. The back $a$ projects rearwardly on a circular arc nearly tangential to the periphery of the saw, so as to afford as much metal as practicable at the back of the tooth.

This enables me to shape the point $a^2$ substantially to a chisel-edge and with this chisel-edge presented in a direction almost tangential to the periphery of the saw, instead of in substantially a radial direction, as heretofore. It therefore enters and severs the wood by a shaving or chiseling action, instead of severing the same by a scraping action, as heretofore.

The dotted line $b$ represents the thickness of the tooth along that portion where the greatest strain is thrown upon it when in use.

I have represented by the dotted lines C a saw as ordinarily constructed when provided with the same clearing-space and with the same metal in the tooth at the point where the greatest strain comes upon it, the latter being indicated by $b'$. It is thus seen that by my construction more teeth are accommodated within the same space without sacrificing either clearing-space or strength. This results in the accomplishment of more work with the same power, or the same work with considerable less power, due alone to this fact of a greater number of teeth. On the other hand, since the teeth operate by a cutting or shaving action rather than with a scraping action a large amount of power is saved by this peculiarity of construction. This construction is applicable alike to circular saws, band-saws, and gang-saws.

This invention is specially designed for saws in which the saw-teeth are formed integrally with the body of the saw.

Owing to the fact that I can locate many more teeth on the periphery of a saw than heretofore, I am enabled to accomplish the same work as heretofore with a correspondingly-slower revolution of my saw, which results in a great saving of power which has heretofore been expended in inducing a high speed of the saw, or with the same speed as heretofore I can accomplish a greatly-increased production, and it is accomplished without the sacrifice of strength in the teeth or contraction of the clearing-throats. It is also apparent that as the back of the tooth extends for some distance very nearly in the arc of the periphery of the saw the repeated dressing of the faces of the teeth does not materially reduce the diameter of the saw. This adds great life to a saw.

The precise improvement I have made resides in the construction of a solid saw wherein each tooth has its face and throat formed of an arc describing a semicircle, starting from the point of the tooth and terminating in an arc, which has a radius about equal to the distance between the points of the teeth and forms the back of the tooth, whereby each tooth is formed with an unbroken curve extending from the point of one tooth forming its face and throat to the point of the next tooth forming the back, whereby the points of all the teeth are brought into the nearest relation to each other to increase the cutting capacity and give a shaving action. In this construction I prefer to form the face and throat of each tooth on a true circle having a diameter about half the distance between the points of the teeth and the distance between the centers of such circles of two teeth about equal to the distance between the points, while the curve of the back describes an arc whose radius is about equal to the distance between the points of the teeth. It is this construction which brings the complete circles which describe the face and throat within and touching the circumference-line of the saw, gives the projecting relation of the points to the faces of the teeth, and a curve without an angle extending from the point of one tooth to the point of the next tooth. The formation of the teeth upon the unbroken curve extending from point to point I have found to give better results than can be obtained with the saw having straight-face teeth now in general use. As compared with such saw, my improvement gives the advantages of increasing the number of teeth without increasing the size of the saw, and thereby increases its cutting capacity.

My improvement gives the advantage of causing the points of the teeth to enter and give the initial cut in the wood in advance of the face of the tooth, and thereby opens the wood and lessens the force of the blow of the tooth, and also lessens the power required to operate the saw, and it does better work than teeth having a straight face.

My improvement affords a free escape for the sawdust, as the unbroken curved formation of the face, throat or gullet, and back of the teeth and the perfect circular form of the face and throat tend to force the sawdust around the semicircle and drive it out over the back of the next tooth.

What I claim is—

As an improved article of manufacture, a saw-blade having its teeth formed integrally therewith, each tooth having its face and throat formed of a true arc describing a semicircle starting from the point of the tooth and terminating without an angle in an arc having a radius about equal to the distance between the points of the teeth and forming the back of the tooth, substantially as described, and to obtain the advantages stated.

In testimony whereof I sign this specification in the presence of two witnesses.

DEXTER HAZARD.

Witnesses:
MARION A. REEVE,
DELL J. BROWNE.